United States Patent

Redmon et al.

[11] Patent Number: 5,088,799
[45] Date of Patent: Feb. 18, 1992

[54] ATTACHMENT WHEELS FOR CONCRETE FINISHING MACHINES

[76] Inventors: Gerald W. Redmon; Tina L. Redmon, both of 2000 W. Arkansas La., Lot 77, Arlington, Tex. 76013

[21] Appl. No.: 550,184

[22] Filed: Jul. 9, 1990

[51] Int. Cl.⁵ .................................. B60B 33/00
[52] U.S. Cl. ............................ 301/111; 301/114; 16/30; 404/112
[58] Field of Search ............... 301/1, 111, 112, 114, 301/115, 121, 122, 124 R, 126, 131; 16/18 R, 20, 29, 30, 37, 45; 404/112

[56] References Cited

U.S. PATENT DOCUMENTS

| 2,342,445 | 2/1944 | Allen | 404/112 |
| 2,621,568 | 12/1952 | Fletcher | 404/112 |
| 2,754,732 | 7/1956 | Beyer | 404/112 |
| 2,754,733 | 7/1956 | Beyer | 404/112 |
| 2,983,203 | 5/1961 | Fletcher | 404/112 |
| 3,091,158 | 5/1963 | Bunger et al. | 404/112 |
| 3,262,377 | 7/1966 | Lursen | 404/112 |
| 3,452,380 | 7/1969 | Walther | 16/30 X |
| 3,463,505 | 8/1969 | German et al. | 16/30 X |
| 3,732,590 | 5/1973 | Horst | 404/112 X |
| 4,559,962 | 12/1985 | Marchiano | 16/30 X |
| 4,854,008 | 8/1989 | Kuo | 16/30 |

FOREIGN PATENT DOCUMENTS 842929 7/1960 United Kingdom ............ 16/30

Primary Examiner—Russell D. Stormer

[57] ABSTRACT

An improved attachment wheels are to be attached on a frame of a machine which provide equipment to rotate on a surface. By attaching the improved attachment wheels on the frame of the machine to move the machine from one place to another. The improved attachment wheels also can be removed so an operator can use the machine to finish a surface. The improved attachment wheels eliminates the need for laborers to carry the machine from one place to another.

2 Claims, 4 Drawing Sheets

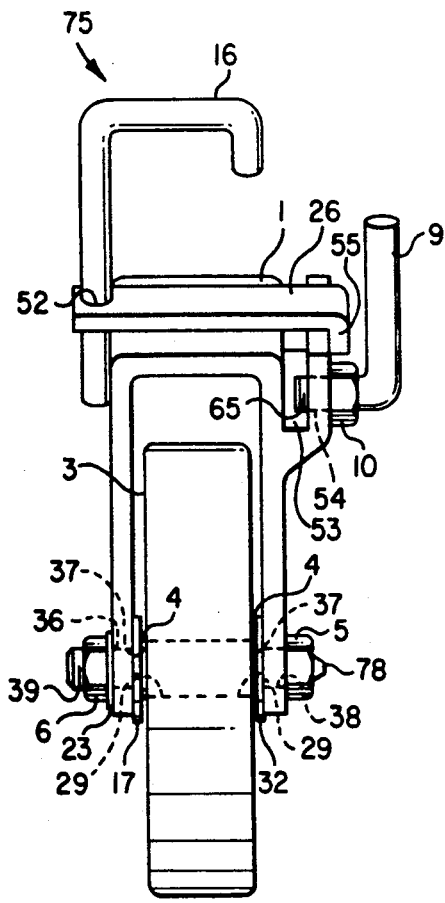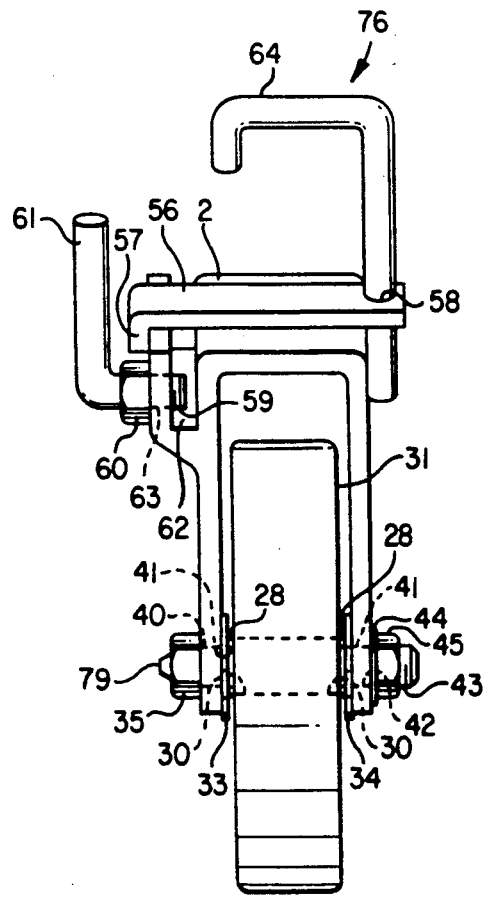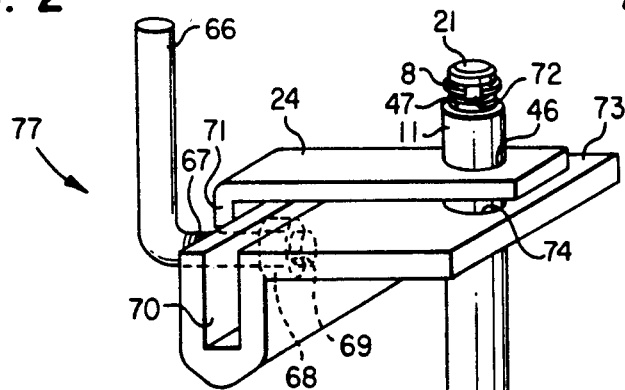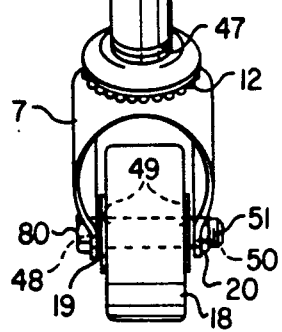
FIG. 2
FIG. 3
FIG. 4

ATTACHMENT WHEELS FOR CONCRETE FINISHING MACHINES

BACKGROUND OF THE INVENTION

This invention relates to an improved attachement wheels which are to be attached on a frame of a machine which provide equipment to rotate on a surface. The improved attachment wheels are strongly in construction and are easier for an operator to move the machine from one place to another.

The improved attachment wheels can also be removed so the operator can use the machine to finish a surface.

In U.S. Pat. No. 2,983,203 to Horace G. Fletcher also in U.S. Pat. No. 2,621,568 to Horace G. Fletcher In U.S. Pat. No. 2,342,445 to Horace D. Allen. These prior art devices disclose having different structure of troweling machines described also different structure of wheels which transport the troweling machines from one place to another.

In U.S. Pat. No. 2,983,203 to Horace G. Fletcher issued May 9, 1961 also In U.S. Pat. No. 2,621,568 to Horace G. Fletcher issued Dec. 16, 1952 has a prior art device described for a troweling machine with one wheel mounted on the machine to transport the troweling machine from one place to another.

In U.S. Pat. No. 2,342,445 to Horace D. Allen issued Feb. 22, 1944 also has a prior art device described for a cement finishing machine with one wheel mounted on the machine to transport the machine from one place to another.

The concrete troweling machines are very heavy machines. None of these prior art devices disclose has no improvements as described for transporting a troweling machine from one place to another safely. The improved attachment wheels eliminates the above described problems.

Before the above prescribed time in the concrete finishing business, no attachment wheels has been used as an attachment to a finishing machine. Laborers would have to pick up the machine by hand and carry the machine from one place to another.

SUMMARY OF THE INVENTION

The improved attachment wheels are to be attached on a frame of a machine which provide equipment to rotate on a surface.

An operator can move the machine by attaching the improved attachment wheels on the frame of the machine to move the machine from one place to another.

The improved attachment wheels can also be removed so the operator can use the machine to finish a surface.

An operator can clean the finishing equipment easier also replace the finishing equipment when the improved attachment wheels are attached on the frame of the machine.

The improved attachment wheels are also safer to an operator when the operator is warming up the machine because the finishing equipment will be above the surface.

The improved attachment wheels also improve machines which provide equipment to rotate on a surface by having improved attachment wheels on a machine so an operator can move the machine from one place to another safely.

The advantages and objects of the improved attachment wheels will become easy to see from the following brief description of the drawings and understood when read in connection with the detailed description of the drawings.

BRIEF DESCRIPTION OF THE DRAWINGS

In FIG. 2, is a front left hand view of the attachment wheel assembly.

In FIG. 3, is a front right hand view of the attachment wheel assembly.

In FIG. 4, is a side view of the attachment caster wheel assembly.

Figure 1:
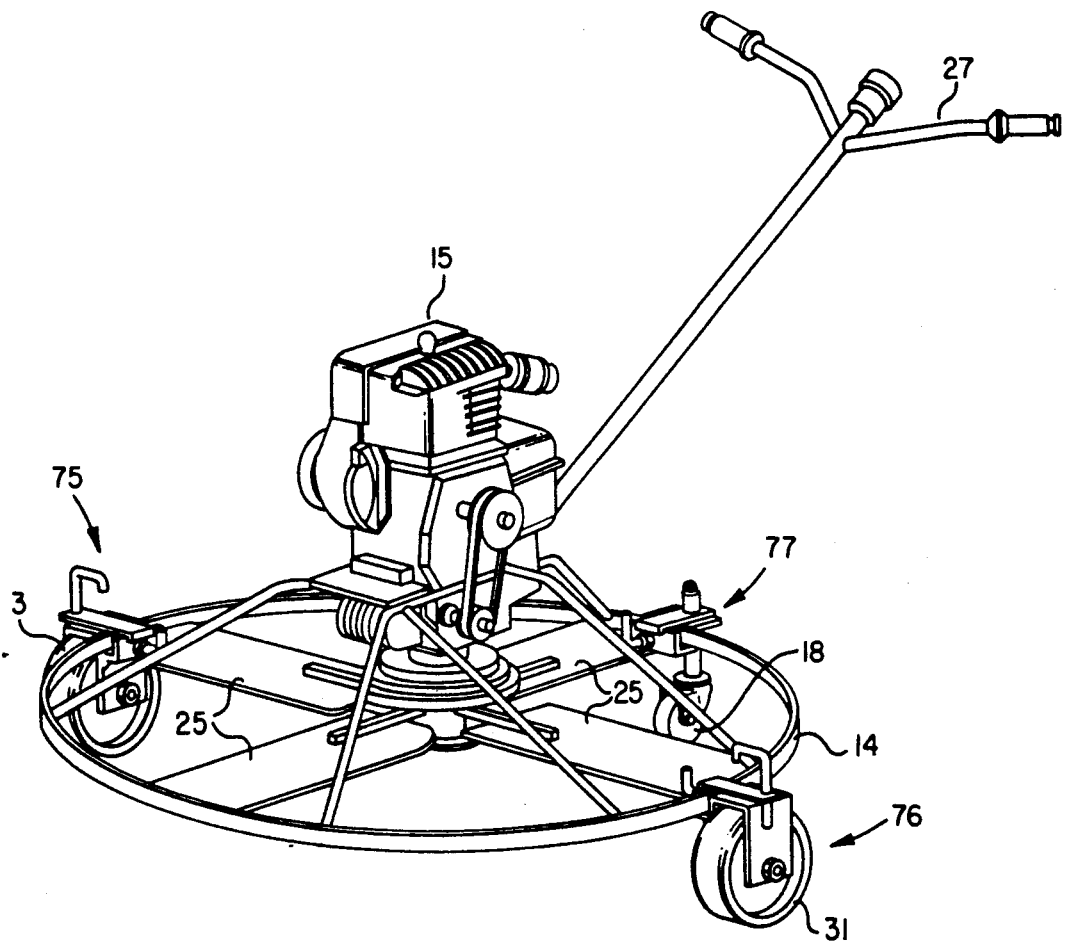
In FIG. 1 is a perspective view of the attachment wheel assemblies attached on the guard ring of a concrete finishing machine.

ELEMENTS OF THE INVENTION 1. bracket
2. bracket
3. wheel
4. spanner bushing
5. axle
6. nut
7. caster
8. e-clip
9. l-bolt
10. nut
11. adapter support
12. ball bearings
14. guard ring
16. handle
17. washer
18. caster wheel
19. axle
20. nut
21. caster stem
23. lock washer
24. cover plate
26. cover plate
28. spanner bushing
29. wheel holes
30. wheel holes
31. wheel
32. washer
33. washer
34. washer
35. axle
36. bracket hole
37. bushing holes
38. bracket hole
39. axle threads
40. bracket hole
41. bushing holes
42. bracket hole
43. axle threads
44. lock washer
45. nut
46. cover plate hole
47. adapter support holes
48. caster hole
49. caster wheel holes
50. caster hole
51. axle threads
52. cover plate hole
53. universal slot
54. universal slot hole -continued 55. cover plate bend
56. cover plate
57. cover plate bend
58. cover plate hole
59. l-bolt threads
60. nut
61. l-bolt
62. universal slot
63. universal slot hole
64. handle
65. l-bolt threads
66. l-bolt
67. l-bolt threads
68. nut
69. universal slot hole
70. universal slot
71. cover plate bend
72. round groove
73. bracket
77. caster wheel assembly
75. wheel assembly
76. wheel assembly
74. welded hole
78. head of axle
79. head of axle
80. head of axle

DETAILED DESCRIPTION OF THE DRAWINGS

Figure 8:
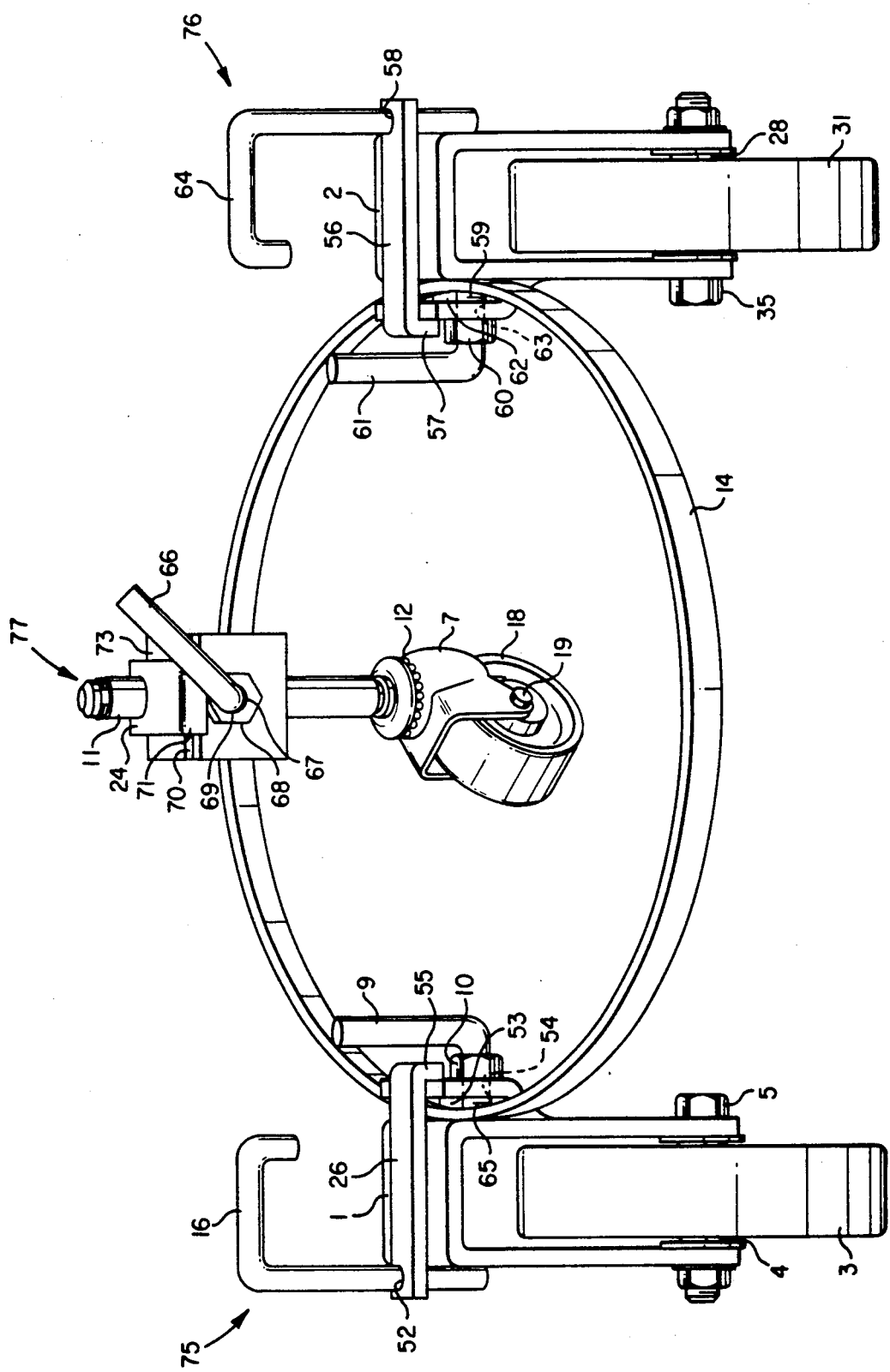
In FIG. 8, is a perspective view of the attachment wheel assemblies attached on the guard ring shown in FIG. 1.

In FIGS. 1 and 8, the attachment wheel assemblies are designated by general reference numerals 75, 76 and 77. The attachment wheel assemblies are mounted on the guard ring 14 of a concrete finishing machine 15. Shown in FIG. 1, the concrete finishing machine 15 includes equipment to rotate on a surface 25 to be finished, and a handle 27.

Figure 5:
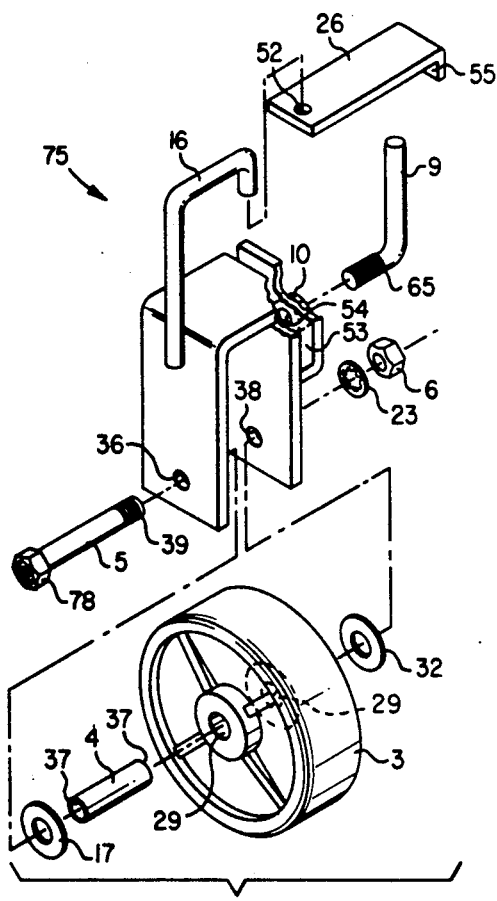
In FIG. 5, is an exploded left hand view of the attachment wheel assembly shown in FIG. 2.

FIGS. 2 and 5, which FIG. 5 is an exploded view of FIG. 2 which a spanner bushing 4 is located inside the wheel holes 29. The spanner bushing 4 is to reduces the wear inside the wheel holes 29. The wheel holes 29 supports the spanner bushing 4 inside the wheel 3. The wheel 3 is located between the bracket 1. The washers 17 and 32 are located inside on each side against the holes 36 and 38 the washers 17 and 32 are used as spacers so the wheel 3 will fit firm on the axle 5. The axle 5 provides a head 78 at the top end and threads 39 at the bottom end. The axle 5 is mounted through the hole 36 and through the washer 17 and through the holes 37 of the spanner bushing 4 and through the washer 32 and through the hole 38. The lock washer 23 is mounted on the axle threads 39 and the nut 6 is screwed on the axle threads 39 which the lock washer 23 and the nut 6 and also the head 78 of the axle 5 are securing the axle 5 on the bracket 1. The axle 5 supports the washers 17 and 32 and the spanner bushing 4 and also the wheel 3 on the bracket 1. The spanner bushing holes 37 supports the wheel 3 on the axle 5. The axle threads 39 supports the lock washer 23 and the nut 6 on the axle 5. The bracket 1 supports the left hand side wheel assembly 75.

Figure 6:
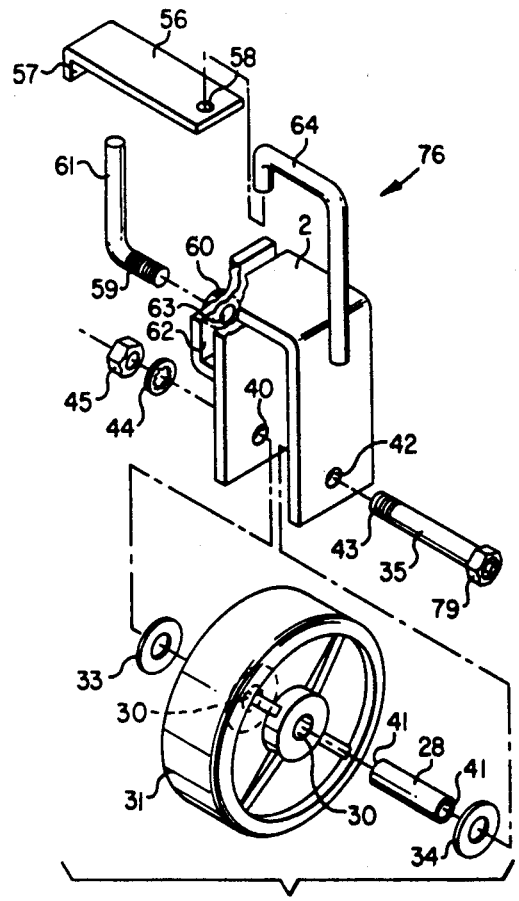
In FIG. 6, is an exploded right hand view of the attachment wheel assembly shown in FIG. 3.

FIGS. 3 and 6, which 6 is an exploded view of FIG. 3 which a spanner bushing 28 is located inside the wheel holes 30. The spanner bushing 28 is to reduces the wear inside the wheel holes 30. The wheel holes 30 supports the spanner bushing 28 inside the wheel 31. The wheel 31 is located between the bracket 2. The washers 33 and 34 are located inside on each side against the holes 40 and 42 the washers 33 and 34 are used as spacers so the wheel 31 will fit firm on the axle 35. The axle 35 provides a head 79 at the top end and threads 43 at the bottom end. The axle 35 is mounted through the hole 40 and through the washer 33 and through the holes 41 of the spanner bushing 28 and through the washer 34 and through the hole 42. The lock washer 44 is mounted on the axle threads 43 and the nut 45 is screwed on the axle threads 43 which the lock washer 44 and the nut 45 and also the head 79 of the axle 35 are securing the axle 35 on the bracket 2. The axle 35 supports the washers 33 and 34 and the spanner bushing 28 and also the wheel 31 on the bracket 2. The spanner bushing holes 41 supports the wheel 31 on the axle 35. The axle threads 43 supports the lock washer 44 and the nut 45 on the axle 35. The bracket 2 supports the right hand side wheel assembly 76.

Figure 7:
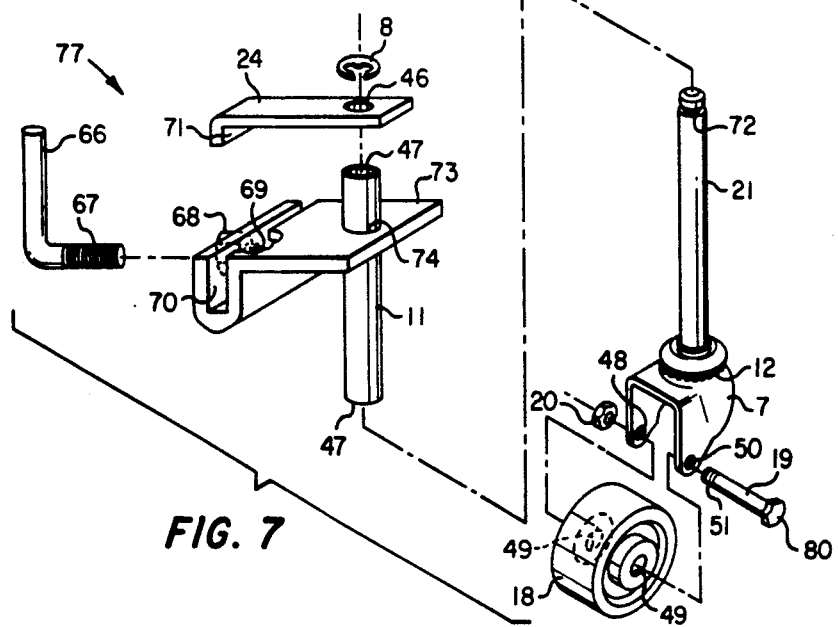
In FIG. 7, is an exploded side view of the attachment caster wheel assembly shown in FIG. 4.

FIGS. 4 and 7, which FIG. 7 is an exploded view of FIG. 4 which a caster wheel 18 is located between the caster 7. The axle 19 provides a head 80 at the top end and threads 51 at the bottom end. The axle 19 is mounted through the hole 48 and through the holes 49 of the caster wheel 18 and through the hole 50. The axle 19 supports the caster wheel 18 on the caster 7. The holes 48 and 50 supports the axle 19 on the caster 7. The holes 49 supports the caster wheel 18 on the axle 19. The caster 7 supports the axle 19 and the caster wheel 18. The nut 20 is screwed on the axle threads 51 which the nut 20 and also the head 80 of the axle 19 are securing the axle 19 on the caster 7. The axle threads 51 supports the nut 20 on the axle 19. The bracket 73 provides an adapter support 11 and also a cover plate 24. Which the cover plate 24 provides a hole 46 which the hole 46 is mounted on the adapter support 11.

The cover plate 24 is mounted on the adapter support 11 simply by placing the hole 46 over the top end of the adapter support 11 and sliding the hole 46 down the adapter 11 and letting the cover plate 24 rest on top of the bracket 73. The hole 46 supports the cover plate 24 on the adapter support 11. The caster stem 21 is mounted through the holes 47 of the adapter support 11. The holes 47 is to mount the caster stem 21 through the adapter support 11. The top end of the caster stem 21 provides a round groove 72. The e-clip 8 is mounted on the round groove 72. The round groove 72 is for the e-clip to be snapped in the round groove 72 to secure the caster stem 21. The e-clip 8 also secures the cover plate 24 on the adapter support 11 so the cover plate will not slip off the adapter support 11. The cover plate 24 can be raised up on the adapter support 11 and the cover plate 24 can be turned to the right or to the left or around the adapter support 11. The bracket 73 provides a hole 74 which the adapter support 11 is mounted through the hole 74. The adapter support 11 is welded on the bracket 73 which the bracket 73 supports the adapter support 11.

In FIG. 1, if the machine 15 needs to be moved from one place to another the attachment wheel assemblies 75, 76, and 77 are to be attached on the guard ring 14 of the machine 15, Shown in FIG. 8 The universal slot 53 is mounted on the left hand side on the guard ring 14. The universal slot 53 is mounted on the guard ring 14 simply by holding the handle 16 and raising the guard ring 14 and placing the universal slot 53 on the bottom of the guard ring 14. The universal slot 53 supports the guard ring 14 while the guard ring 14 is resting in the universal slot 53, also the universal slot 53 supports the wheel assembly 75 on the guard ring 14. The handle 16 is welded in the center on the side of the bracket 1 which the handle 16 is to place the wheel assembly 75 easier on the guard ring 14. The bracket 1 provides a cover plate 26 which the cover plate 26 provides a hole 52. The cover plate 26 is mounted on the handle 16 simply by placing the cover plate 26 upside down and placing the hole 52 underneath the top end of the handle 16 and sliding the hole 52 down the handle 16 and letting the cover plate 26 rest on top of the bracket 1 and over the guard ring 14 and over the slot 53. The hole 52 supports the cover plate 26 on the handle 16. The cover plate 26 provides a bend 55 which the bend 55 is resting on the top and over the side of the universal slot 53. The bend 55 of the cover plate 26 supports the universal slot 53 on the guard ring 14. The handle 16 also supports the cover plate 26 while the cover plate 26 is resting on top of the bracket 1. The universal slot 53 provides a hole 54 and a nut 10 which the nut 10 is welded against the hole 54. The nut 10 is located on the outside in the center of the universal slot 53 the hole 54 is located on the inside of the nut 10 and on the inside in the center of the universal slot 53. The end of the 1-bolt 9 provides threads 65 which the threads 65 is screwed through the nut 10 and pass through the hole 54. The threads 65 supports the 1-bolt 9 in the nut 10 and in the hole 54. The 1-bolt 9 supports the guard ring 14 on the left hand side in the universal slot 53 and against the bracket 1. The nut 10 and the hole 54 supports the threads 65 of the 1-bolt 9 in the universal slot 53.

The universal slot 62 is mounted on the right hand side on the guard ring 14. The universal slot 62 is mounted on the guard ring 14 simply by holding the handle 64 and raising the guard ring 14 and placing the universal slot 62 on the bottom of the guard ring 14. The universal slot 62 supports the guard ring 14 while the guard ring 14 is resting in the universal slot 62, also the universal slot 62 supports the wheel assembly 76 on the guard ring 14. The handle 64 is welded in the center on the side of the bracket 2 which the handle 64 is to place the wheel assembly 76 easier on the guard ring 14. The bracket 2 provides a cover plate 56 which the cover plate 56 provides a hole 58. The cover plate 56 is mounted on the handle 64 simply by placing the cover plate 56 upside down and placing the hole 58 underneath the top end of the handle 64 and sliding the hole 58 down the handle 64 and letting the cover plate 56 rest on top of the bracket 2 and over the guard ring 14 and over the slot 62. The hole 58 supports the cover plate 56 on the handle 64. The cover plate 56 provides a bend 57 which the bend 57 is resting on the top and over the side of the universal slot 62. The bend 57 of the cover plate 56 supports the universal slot 62 on the guard ring 14. The handle 64 also supports the cover plate 56 while the cover plate 56 is resting on top of the bracket 2. The universal slot 62 provides a hole 63 and a nut 60 which the nut 60 is welded against the hole 63. The nut 60 is located on the outside in the center of the universal slot 62 the hole 63 is located on the inside of the nut 60 and on the inside in the center of the universal slot 62. The end of the 1-bolt 61 provides threads 59 which the threads 59 is screwed through the nut 60 and pass through the hole 63. The threads 59 supports the 1-bolt 61 in the nut 60 and in the hole 63. The 1-bolt 61 supports the guard ring 14 on the right hand side in the universal slot 62 and against the bracket 2. The nut 60 and the hole 63 supports the threads 59 of the 1-bolt 61 in the universal slot 62.

The universal slot 70 is mounted on the rear on the guard ring 14. The universal slot 70 is mounted on the guard ring 14 simply by raising the cover plate 24 on the adapter 11 and turning it to the right or left and then placing the universal slot 70 on the bottom of the guard ring 14. The universal slot 70 supports the guard ring 14 while the guard ring 14 is resting in the universal slot 70 also the universal slot 70 supports the caster wheel assembly 77 on the guard ring 14. The cover plate 24 which provides a bend 71 is then placed back in the center on top of the bracket 73 and over the guard ring 14 and over the universal slot 70 which the bend 71 is resting on the top and over the side of the universal slot 70. The bend 71 of the cover plate 24 supports the universal slot 70 on the guard ring 14. The universal slot 70 provides a hole 69 and a nut 68 which the nut 68 is welded against the hole 69. The nut 68 is located on the outside in the center of the universal slot 70 the hole 69 is located on the inside of the nut 68 and on the inside in the center of the universal slot 70. The end of the 1-bolt 66 provides threads 67 which the threads 67 is screwed through the nut 68 and pass through the hole 69. The threads 67 supports the 1-bolt 66 in the nut 68 and in the hole 69. The 1-bolt 66 supports the guard ring 14 on the rear in the universal slot 70 and against the bracket 73. The nut 68 and the hole 69 supports the threads 67 of the 1-bolt 66 in the universal slot 70.

In FIG. 1 the machine 15 can be easily moved by an operator by pushing the machine 15 by the handles 27.

Shown in FIG. 8 the wheel assemblies 75 and 76 which includes the wheels 3 and 31 and the spanner bushings 4 and 28 which rotate around the axles 5 and 35 to move the machine 15. The caster wheel assembly 77 which provides a caster 7 which provides ball bearings 12. The ball bearings 12 turns the caster 7 and the caster wheel 18 in a circular motion which the caster wheel 18 rotates around the axle 19 to move the machine 15 in any direction on the surface.

In FIG. 1 when an operator needs the machine 15 to finish a surface with the finishing equipment 25 by loosening the 1-bolts shown in FIGS. 8, 9, 61, and 66 in the wheel assemblies 75, 76, and 77 and also raising the cover plates 26, 56, and 24 and turning them to the right or to the left in the wheel assemblies 75, 76, and 77 and by sliding the the universal slots 53, 62, and 70, off the guard ring 14. The wheel assemblies 75, 76, 77, are removed so the operator can use the machine 15 to finish a surface with the finishing equipment 25.

We claim:

1. A wheel assembly for attachment to a finishing machine, said finishing machine including moving parts and a guard ring encircling said moving parts, the wheel assembly comprising:

at least one wheel mounted for rotational movement on an axle, a U-shaped bracket having first and second legs connected by a cross member, said U-shaped bracket being supported in an inverted position with said leg depending downwardly from said crossmember, each leg having a hole therethrough, said holes being axially aligned with one another with said axle being supported in said holes; a cover plate overlying the crossmember of said U-shaped bracket;

a rod means extending downwardly from said cover plate along said first leg of said U-shaped bracket.

an L-shaped member having first and second arms, the end of said first arm engaging said cover plate and the end of said second arm engaging said second leg of said U-shaped bracket;

said first arm of said L-shaped member having a threaded aperture therein for receiving a threaded end of an L-bolt and oriented such that the distal end of said second arm meets said second leg of said U-shaped bracket forming a space therebetween, an L-bolt having an end extending through said aperture;

such that when said wheel assembly is attached to said finishing machine, a portion of said guard ring is received in said space and held against said second leg of said U-shaped bracket by the portion of said L-bolt extending through said aperture, whereby said wheel assembly can be releasably secured to said finishing machine.

2. The wheel assembly as set forth in claim 1 wherein the rod means includes a handle portion to aid in lifting said finishing machine when said wheel assembly is secured to the guard ring.

* * * * *